United States Patent
Chapman

[19]

[11] 3,777,109
[45] Dec. 4, 1973

[54] PROCESS AND APPARATUS FOR REMOVING UNDESIRED WINDINGS FROM WIREWOUND ELEMENTS

[75] Inventor: John L. Chapman, Bloomington, Calif.

[73] Assignee: Bourns, Inc., Riverside, Calif.

[22] Filed: Apr. 20, 1972

[21] Appl. No.: 245,913

[52] U.S. Cl. ................................. 219/85, 219/107
[51] Int. Cl. ............................................. B23k 1/04
[58] Field of Search ......................... 29/426, 426 X; 219/85, 107, 129

[56] References Cited
UNITED STATES PATENTS
2,403,070   7/1946   Fulton............................ 219/107 X Primary Examiner—C. L. Albritton
Attorney—William G. Becker

[57] ABSTRACT

Apparatus and process for removing undesirable windings from a wirewound element wherein an elongate strip of brazing material is laid across the windings to be removed, at a substantial angle to the axis of the mandrel on which the wire is wound. An electric current is applied, for example by the use of parallel gap welding electrodes, to the brazing material at the place of contact with the windings so as to sever the windings in contact with the brazing material and the brazing material itself and simultaneously attach the severed brazing material ends to the respective ends of the severed windings. Then the resulting pieces of brazing material are grasped and pulled away from the mandrel thereby causing the attached severed windings to be removed from the mandrel.

10 Claims, 6 Drawing Figures

PATENTED DEC 4 1973 3,777,109

PROCESS AND APPARATUS FOR REMOVING UNDESIRED WINDINGS FROM WIREWOUND ELEMENTS

BACKGROUND OF THE INVENTION

This invention relates to the field of wirewinding and in particular to a process and apparatus for removing undesirable windings from a mandrel.

In the field of resistance manufacture, wirewound resistance elements are frequently used in both fixed and variable resistors. Usually the wirewound resistance element is formed by taking a length of elongate material, usually in cylindrical rod form and of ceramic or metallic composition, and closely winding a wire of resistance material along the entire length of the mandrel. If the mandrel is made of an electrical conductor, before the wire is wound thereon an insulative layer, such as varnish, is applied to the surface of the mandrel. This, of course, is not necessary in the case of a ceramic mandrel which is in itself electrically insulative. Conventionally, just prior to the winding operation or after the winding is completed, a layer of a material such as varnish is applied to the windings to insulate them from adjacent windings and secure them to the mandrel. The wound mandrel is then cut into portions having slightly more than the desired length of resistance material. As a result of the cutting operation, loose ends, commonly referred to as "pigtails," occur at the ends of the pieces where cutting took place. The pigtail is merely wire that has been pulled from the mandrel during the cutting operation and may be of considerable length. Irrespective of the type of mandrel used, it is undesirable to have a substantial length of resistance wire extending from the mandrel as it may inadvertently cause an undesirable electrical connection or get in the way of moving parts when the wirewound element is used in a variable resistor or potentiometer. When an electrically conductive mandrel is used, it is especially important to remove the pigtails because they may cause a short circuit by contacting both exposed ends of the mandrel.

In the past, pigtails have usually been removed by having an operator manually grasp the pigtail with tweezers or pliers, pull a few turns of wire off the mandrel and then break it off. This method of removing the pitail is extremely time consuming and expensive in that the only practical way to do it is by hand.

SUMMARY OF THE INVENTION

Thus it is an object of the subject invention to provide a process and apparatus for quickly and easily removing undesired windings from a wirewound element.

It is a further object of the subject invention to provide a process and apparatus whereby undesired windings can be removed from a wirewound element mechanically.

The above-mentioned objects are fulfilled in the subject invention by providing a process and apparatus wherein an elongated portion of brazing material is placed in contact with the windings that are desired to be removed, with the brazing material extending at a substantial angle to the axis of the mandrel on which the wire is wound; applying an electric current to the brazing material at the place of contact with the windings sufficient to sever both the brazing material and the windings at their place of contact and simultaneously attach the severed ends of the brazing material to the respective severed ends of the windings; and pulling the resultant pieces of the brazing material away from the mandrel so as to remove the attached severed windings therefrom. This process is a highly efficient and effective way of removing windings and their connected pigtails from a wirewound element which can easily be automated so as to effect ease and economy of manufacture.

The subject matter which is regarded as the present invention is particularly pointed out and distinctly claimed in the concluding portion of this specification.

BRIEF DESCRIPTION OF THE DRAWINGS

The present invention, however, both as to organization and method of operation, together with further objects and advantages thereof, may best be understood by reference to the following description taken in connection with the accompanying drawings in which.

DESCRIPTION OF THE PREFERRED EMBODIMENT

Figure 1:
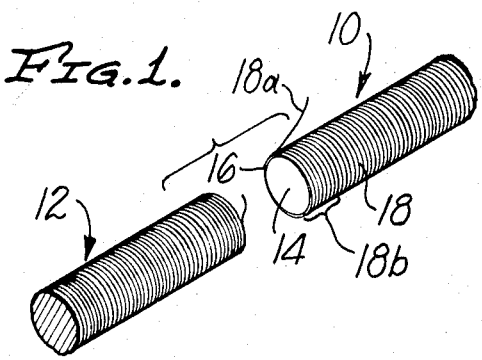
FIG. 1 is a perspective view of a wirewound mandrel which has just been cut.

In FIG. 1, two wirewound elements 10, 12 are shown just after they have been cut from a length of wirewound stock. In this case, wirewound element 10 is shown as being comprised of a metallic mandrel 14, a layer of insulative material 16, such as varnish, and windings 18 of a resistance wire. It should be noted that the process and apparatus of the subject invention can be used with almost any wirewound element irrespective of the material or shape of the mandrel, the insulative material used, or the size and composition of the wire which is wound on the mandrel. For example, the resistance wire may be formed of a metallic alloy comprised of nickel, chromium, aluminum and cobalt or of a copper-nickel alloy. A pigtail 18a which has been unwound from an end of element 10 during the cutting step is shown. It can be readily seen that pigtail 18a could inadvertently come into contact with the exposed end of mandrel 14 or could otherwise affect the mechanical or electrical operation of a device in which the element is used.

Each element is cut to a size such that the length of resistance wire wound thereon is longer than that actually needed because terminals will be electrically connected to the windings at appropriate places spaced from the ends of the elements. Thus it is acceptable, and generally desirable, to remove along with the pigtail 18a a portion 18b of the windings at the end of the element.

In FIGS. 2 – 5, the apparatus for performing the process of the subject invention is shown during various stages in the operation. The apparatus is comprised of a block 20 having at least one passageway 20a therein for holding an element 10. Preferably the cross section of passageway 20a is just slightly larger than the cross section of an element 10, and the length of passageway 20a is shorter than the length of element 10 so that a portion somewhat longer than the portion of windings to be removed is exposed. A spool 22 of elongate member 24 of brazing material, such as silver solder in ribbon form, is provided at one end of block 20.

Guide means comprised of a box guide 26 and an open channel guide 28 are attached to block 20 to guide the strip of brazing material 24 both before and after it contacts or comes close to the winding portion 18b to be removed. The guide means shown are merely exemplary and any suitable guide means, if any at all are desired, can be used. It is not necessary that the brazing member be guided so that it actually contacts winding portion 18b, but merely that it is placed in the proper position so that it can be made to contact the windings at the proper place. It is, of course, desirable to have the brazing member extend at a substantial angle, such as the 90° angle shown, to the axis of the mandrel to facilitate pulling the brazing member pieces away from the mandrel as will be explained hereafter.

Figure 2:
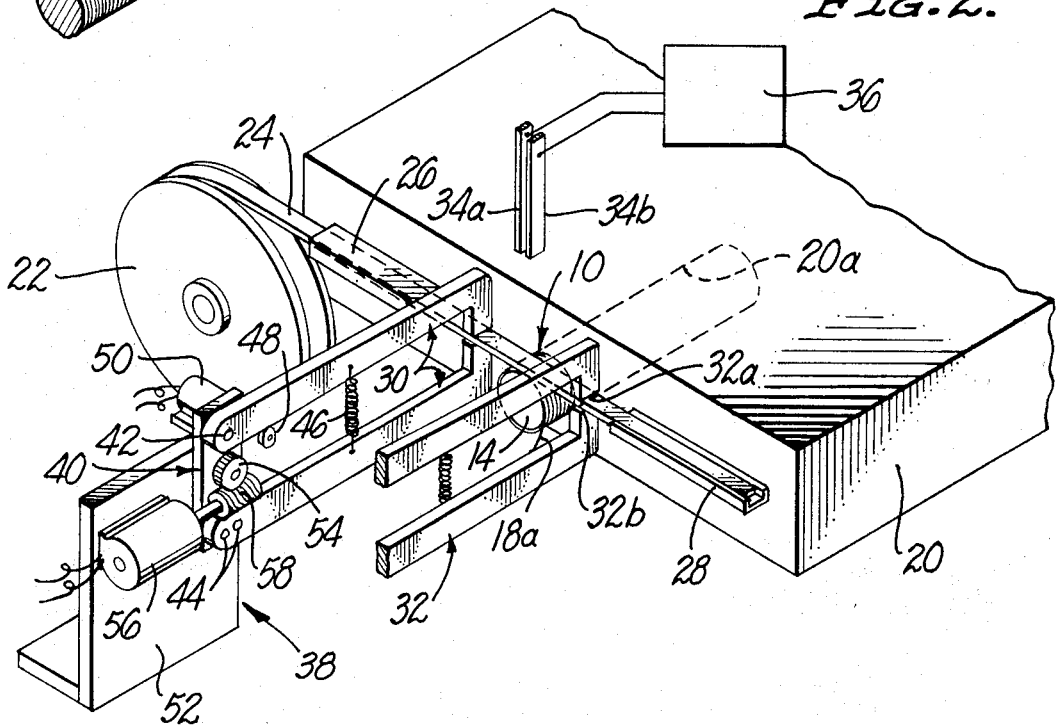
FIG. 2 is a perspective view of apparatus for performing the process of the subject invention wherein the brazing material has just been put in contact with the windings.

Means for pulling the pieces of brazing member 24 away from the mandrel are comprised of two pairs 30, 32 of grasping members having surfaces 30a, b and 32a, b for clamping onto brazing member 24. The grasping surfaces 30a, b and 32a, b of each pair are disposed on opposite sides of brazing member 24 with one pair being on each side of the element 10. Initially the gap between the surfaces is much larger than the thickness of the brazing member 24, however, actuating means 38 are provided for causing members 30 and 32 to grasp pieces of brazing material 24 and move as a unit vertically downward away from the mandrel, as will be explained in greater detail hereafter. As shown in FIG. 2, actuating means 38 is comprised of a support member 40 to which the upper arm of means 30 is pivotally connected via pivot shaft 42 and the lower arm of means 30 is fixedly attached via bolts 44. Spring means 46 is shown for biasing the arms toward each other. A cam 48 driven by a motor 50 engages the upper arm to separate grasping surfaces 30a, b when brazing material 24 is being fed through guide means. Support member 40 is pivotally connected to base member 52 by pivot shaft 54. A motor 56 is mounted on member 52 and drivingly connected to support member 40 by means of a worm gear drive 58 for pivoting both arms of means 30 when the brazing member pieces are to be pulled away from mandrel 14. Of course, a similar mechanism may be used with grasping means 32.

Means for applying an electric current to brazing member 24 at its place of contact with windings 18b and hence to windings 18b at this same place are shown as being comprised of a pair of closely spaced, parallel welding electrodes 34a, b which are in turn connected to a source of electrical power such as a capacitance network, indicated schematically by box 36. Such welding apparatus is, of course, well known in the art. Of course, any other suitable grasping means or means for applying current to the brazing member may be utilized. Means (not shown) for lowering electrodes 34 to contact brazing member 24 can be any conventional setup, well known in the art.

Figure 3:
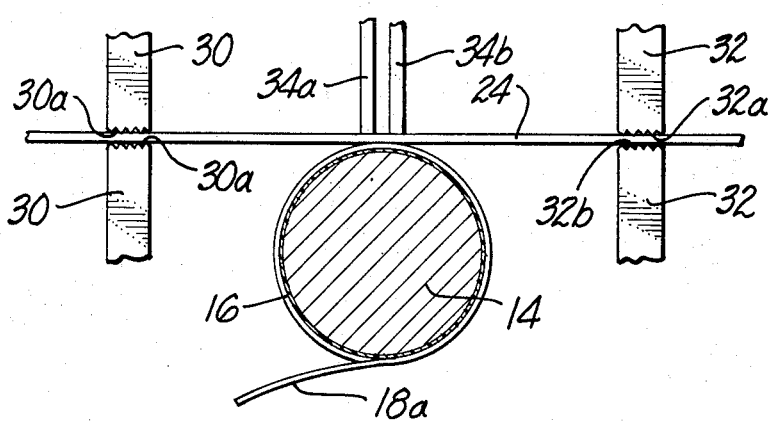
FIG. 3 is a partial front view of the apparatus shown in FIG. 2 wherein the welding electrodes have just been placed in contact with the brazing material.
Figure 4:
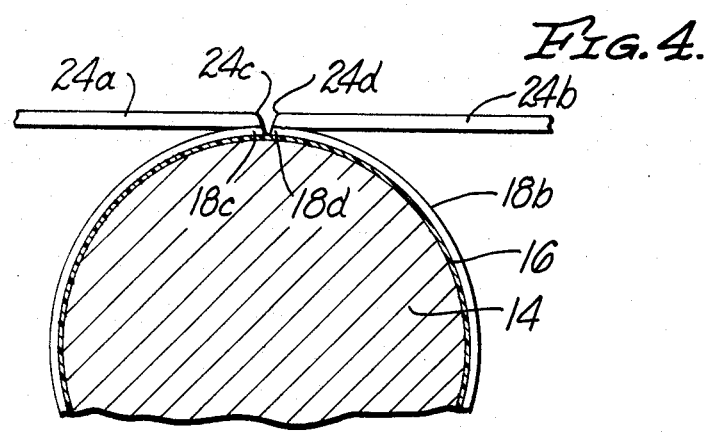
FIG. 4 is an enlarged partial front view showing the brazing material and windings just after the electric current has been applied thereto.
Figure 5:
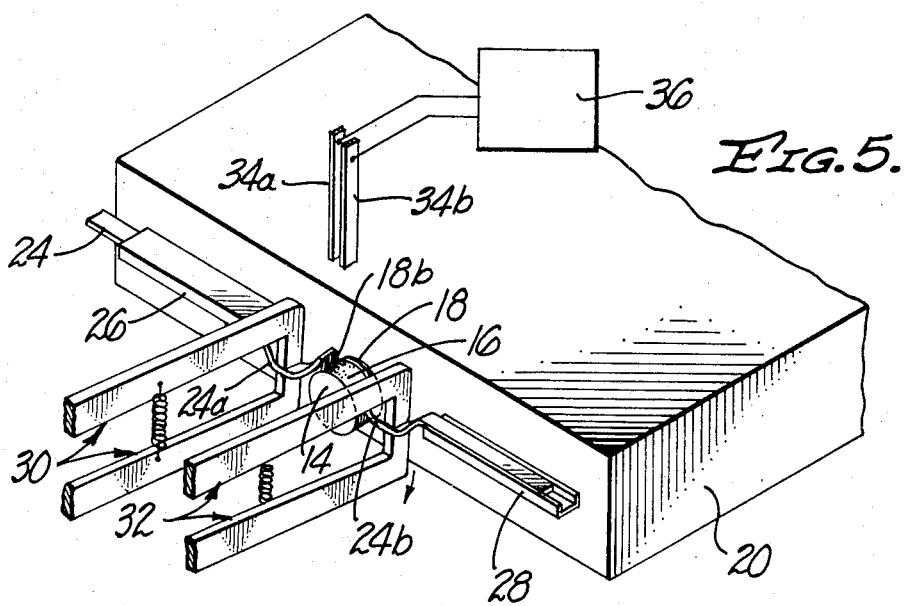
FIG. 5 is a perspective view of the apparatus shown in FIG. 2 wherein the pieces of brazing material and attached severed windings are being pulled away from the mandrel.

The sequence of operations of the process of the subject invention can best be understood by reference to FIGS. 2 – 5 in sequence. First, wirewound element 10 which has been cut from a long piece of wirewound stock is placed within passageway 20a in support block 20 so that the windings 18b and connected pigtail 18a, which are to be removed, are exposed. A length of brazing member 24 is then fed through guide means 26, across the top of windings 18b and through guide means 28, as shown in FIG. 2. Then electrodes 34a, b are lowered so as to place them in contact with brazing member 24 which is in turn forced to contact a portion of windings 18b, as shown in FIG. 3. Grasping members 30 and 32 may be actuated to grasp portions of brazing member 24 at any time after brazing member 24 has been fed through the guide means. A current is then applied through welding electrodes 34a, b sufficient to sever the brazing member 24 and the underlying wire windings 18b at their place of contact and simultaneously attach the severed ends 24c, 24d of brazing member 24 to the severed ends 18c, 18d of windings 18b. It is not necessary, though desirable, to have the windings completely severed. Care should be taken to assure that the electric current is of sufficient amplitude and duration to accomplish these purposes while not being of too great a magnitude and/or duration to cut through insulating layer 16. Fixing these parameters is best done by trail and error. Then, after grasping means 30, 32 have engaged the two pieces 24a, 24b of brazing member 24, the pieces 24a, 24b with the attached severed windings 18b are pulled away from mandrel 14, as shown in FIG. 5, so as to remove the end windings and connected pigtail from element 10.

Figure 6:
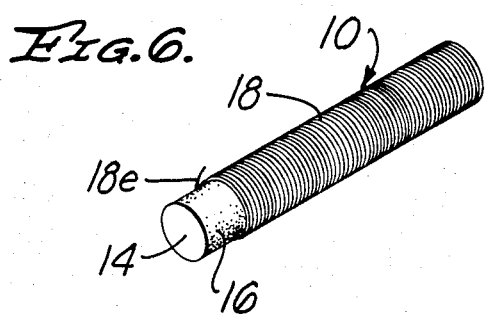
FIG. 6 is a perspective view of a wirewound resistance element after the undesired windings and pigtail have been removed in accordance with the subject invention.

FIG. 6 shows the resultant element 10 with the undesired windings 18b removed therefrom. As a result of this process, there may be a very small pigtail 18e remaining. However, this pigtail is usually of a very short length, no greater than one-half the circumference of mandrel 14. Pigtail 18e is almost always much smaller than the original pigtail 18a and additionally is displaced from the exposed end of the mandrel a substantial distance due to the removal of the end windings so that there is practically no possibility of the pigtail causing a short circuit on the end of mandrel 14.

Of course, the process and apparatus of the subject invention can be used to remove undesired windings located anywhere between the ends of an element. For example, it would be possible to use the process and apparatus of the subject invention to remove sections of windings along the length of wirewound stock before it is cut into pieces.

While the brazing member has been shown to be in ribbon form, it is understood that the width of the material used would be determined by the number and size of the windings which are to be removed. If only one or two windings were desired to be removed, a brazing material in strand form could be utilized. While the brazing member, in its preferred form, is of material such as silver solder (typically composed of 50 percent or more silver along with copper, zinc and cadmium) which results in brazing of the member 24 to the windings 18b, any soldering, welding or other brazing material including combinations and laminations of materials which would permit the severing action and simultaneous attachment action to take place are contemplated within the term "brazing member" as recited herein.

Additionally, while the subject invention has been particularly disclosed in relation to removing windings from a wirewound resistance element, it is obvious that such a process and apparatus can be used to remove substantially any type of wire windings from any type of wirewound element such as, for example, an inductance coil.

Thus, the subject invention is to be limited only by the appended claims.

What I desire to secure by letters patent of the United States is:

1. A process for removing an undesirable wire portion from a wire winding on a mandrel comprised of the steps of
   1. placing a portion of an elongate brazing member in contact with a surface of the wire portion to be removed from the mandrel at a substantial angle to the axis of the winding on the mandrel;
   2. applying an electric current to the brazing member at the place of contact sufficient in magnitude and duration to substantially sever the windings in contact with the brazing member, sever the brazing member at this place of contact and attach the severed ends of the brazing member to the severed ends of the windings so as to form two opposed brazing member pieces with an end of each piece being attached to one end of the severed windings; and
   3. pulling the brazing member pieces away from the mandrel so as to pull the attached, severed windings off the mandrel.

2. A process as in claim 1 wherein said brazing member is in ribbon form.

3. A process as in claim 1 wherein said brazing member is silver solder.

4. A process as in claim 1 wherein said electric current is applied through a pair of closely spaced welding electrodes.

5. A process as in claim 1 wherein said brazing member pieces are pulled away from the mandrel by members which grasp the brazing member pieces.

6. Apparatus for removing an undesirable wire portion from a wire winding on a mandrel comprising:
   1. an elongate brazing member;
   2. means for placing said brazing member in contact with a surface of the wire portion to be removed from the mandrel at a substantial angle to the axis of the winding on the mandrel;
   3. means for applying an electric current to the brazing member at the place of contact sufficient in magnitude and duration to substantially sever the windings in contact with said brazing member, sever the brazing member at this place of contact and attach the severed ends of the brazing member to the severed ends of the windings so as to form two opposed brazing member pieces with an end of each piece being attached to one end of the severed windings; and
   4. means for pulling said brazing member pieces away from the mandrel so as to pull the attached severed windings off the mandrel.

7. Apparatus as in claim 6 wherein said brazing member is in ribbon form.

8. Apparatus as in claim 6 wherein said brazing member is silver solder.

9. Apparatus as in claim 6 wherein said means for applying an electric current includes a pair of closely spaced welding electrodes.

10. Apparatus as in claim 6 wherein said means for pulling said brazing member pieces includes means for grasping said brazing member pieces.

* * * * *